United States Patent

[11] 3,622,299

[72] Inventor Francis L. Swillinger
Perrysburg, Ohio
[21] Appl. No. 740,193
[22] Filed June 26, 1968
[45] Patented Nov. 23, 1971
[73] Assignee Libbey-Owens-Ford Glass Company
Toledo, Ohio

[54] FLOAT GLASS METHOD AND APPARATUS FOR CONTROLLING TEMPERATURE
7 Claims, 6 Drawing Figs.
[52] U.S. Cl. .................................................. 65/99 A,
65/173, 65/182 R, 165/96
[51] Int. Cl. ........................................................ C03b 18/02
[50] Field of Search ............................................ 65/99, 182,
204, 356, 173; 165/96

[56] References Cited
UNITED STATES PATENTS

| | | | |
|---|---|---|---|
| 1,117,444 | 11/1914 | Robinson ...................... | 165/96 |
| 3,157,483 | 11/1964 | Dunipace ...................... | 65/204 |
| 3,222,154 | 12/1965 | Pilkington ...................... | 65/182 X |
| 3,333,936 | 8/1967 | Warren ......................... | 65/99 X |
| 3,485,614 | 12/1969 | Long ............................. | 65/99 |

Primary Examiner—S. Leon Bashore
Assistant Examiner—J. B. Hardaway
Attorney—Collins & Oberlin ABSTRACT: This application discloses a method of selectively controlling, regulating and/or varying the temperature of a moving, glass ribbon and/or of the molten metal bath in a float glass apparatus, which involves the use of a cooling member, extending across the float chamber and provided with an insulating sleeve or sleeves slideable thereon, and the selective positioning of said sleeves to reduce the cooling action of the member in selected areas along the length thereof.

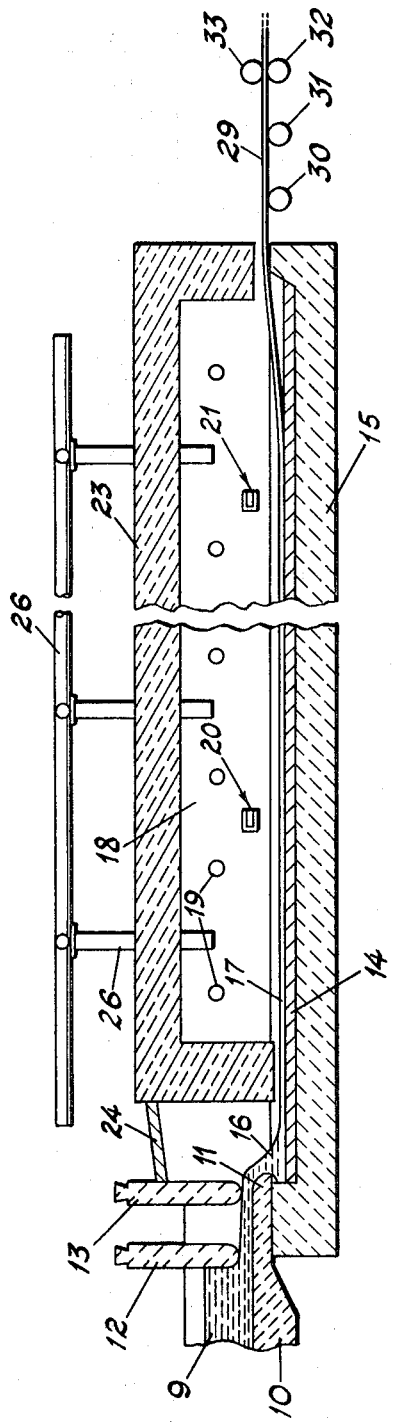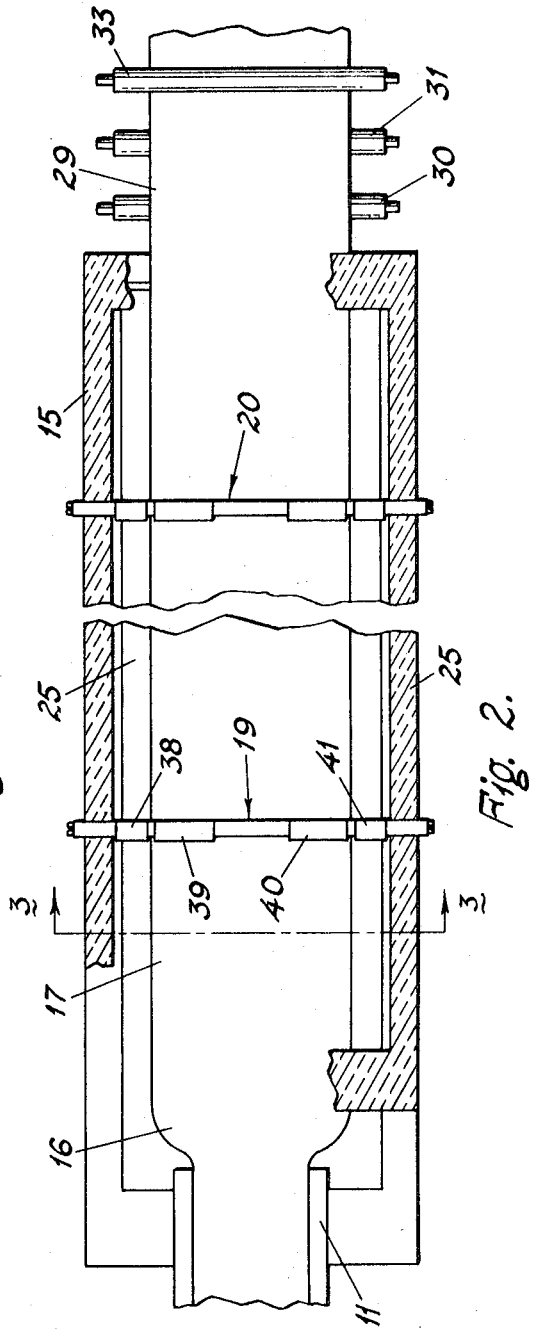

INVENTOR.
Francis L. Swillinger
BY
Collins & Oberlin
ATTORNEYS

FLOAT GLASS METHOD AND APPARATUS FOR CONTROLLING TEMPERATURE

BACKGROUND OF THE INVENTION

1. Field of the Invention

The present invention broadly to means and techniques for controlling the temperature of liquid and/or solid bodies. More particularly it is concerned with heat exchangers of special construction and with a method of operating the same to regulate their capacity to exchange heat with an adjacent body or mass.

2. Description of the Prior Art

Although not restricted thereto, the invention is primarily adapted for use in the manufacture of glass and in an area wherein a body of glass or other metal in sheet and/or in molten form is being processed.

Representative examples of such areas are the enclosed drawing chambers of window glass machines, through which a continuous ribbon is drawn from a mass of molten glass (shown for example in U.S. Pat. No. 2,267,604, issued Dec. 23, 1941, to John L. Drake et al.), and the enclosed float chambers in float glass machines, within which a buoyant body of molten glass in ribbon form is established on and advanced over a bath of molten tin (see U.S. Pat. No. 3,083,551, issued Apr. 2, 1963, to L. A. B. Pilkington).

In fact the invention appears presently to have its greatest potential when embodied in means and procedures for cooling the glass ribbon in the float environment and it will be specifically described in that connection here. Thus, in the production of float glass it is sometimes necessary to positively cool the floating glass ribbon and/or the float bath to assist in establishing and controlling the temperature pattern of the glass and to properly maintain the bath of molten tin on which it floats. Because a given float bath may be required to produce glass ribbons of different thicknesses, different widths, or at different ribbon speeds, the amount, degree and pattern of cooling required may vary over wide limits both longitudinally and transversely of the path of travel of the floating glass ribbon.

Further, the cooling pattern and rate in the areas where the ribbon is soft and can be easily deformed or distorted is of rapid importance to the final quality of the glass. Too rapid chilling or cooling of the glass and tin, for example, will cause what is known as "dapple" or "hammer" in the ribbon which become distortion defects in the final product.

SUMMARY

According to this invention there is provided a method of more efficiently, exactly and flexibly controlling surface temperatures, particularly where different or varying temperatures are required across a surface, which employs a heat exchanger in the form of an elongated core member maintained at a temperature different from said surface, and an insulating shield, sleeve or cover that is movable over and into selected positions on said member.

BRIEF DESCRIPTION OF THE DRAWINGS

In the drawings wherein like numerals designate like parts throughout:

FIG. is a longitudinal, sectional view through a conventional float glass forming machine equipped with heat exchangers of the invention in representative locations;

FIG. 2 is a plan view of the apparatus of FIG. 1 with the plenum chamber removed;

DESCRIPTION OF THE PREFERRED EMBODIMENTS

Figure 3:
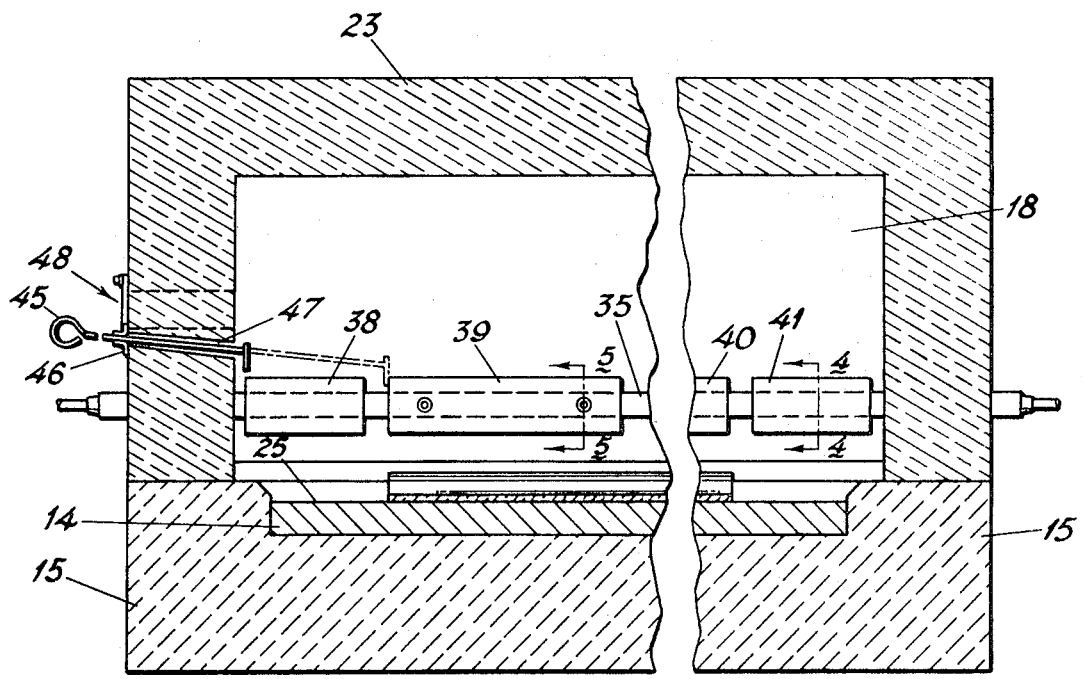
FIG. 3 is a transverse, vertical, sectional view taken substantially along the line 3—3 in FIG. 1.

Referring now more particularly to the drawings, there is illustrated in FIGS. 1 and 2 a typical float glass apparatus which is generally similar to the one disclosed in U.S. Pat. No. 3,083,551. In this apparatus molten glass 9 is supplied from a forehearth 10 to a spout lip 11 in an amount regulated and controlled by a tweel 12 and a gate 13.

The glass flowing from the spout 11 onto the metal bath 14, contained in a tank 15, forms a buoyant molten body of glass indicated at 16 and a buoyant layer of stable thickness 17 develops therefrom and floats over the bath as a continuous ribbon. The metal bath 14 in the tank structure and the headspiece 18 over the bath are heated by radiant heat directed downwardly from heaters 19 and, under certain operating conditions, it is desirable or necessary to also provide cooling means in this area.

According to the instant invention, this can be done and greatly improved temperature control obtained by the use of special heat exchangers such as indicated at 20 and 21 in the headspace 18.

The headspace 18, which contains the "float atmosphere," is enclosed by a roof structure 23 which cooperates with the tank 15 to provide a plenum chamber surrounding the headspace 18 and, with extension 24, makes it possible to maintain a sufficient volume of protecting gas over the part 25 of the metal bath 14 that is exposed at each side of the glass in the float chamber (FIGS. 2 and 3). The roof structure 23 is provided at intervals with ducting 26 through which a protecting gas is fed into the headspace 18 at a rate to create a plenum therein and so prevent entrance of atmospheric air.

When the ultimate ribbon 29, emerging from the machine, is to be of substantially the same thickness as the equilibrium or stabilized thickness of the molten glass, the temperature of the glass in the buoyant layer or ribbon 17 must be carefully controlled so as to progressively cool it as it travels toward the discharge end of the apparatus.

This can be facilitated by the use of the heat exchangers 20 and 21 which may be located and controlled within the headspace 18 to act to any desired extent on any desired area of the glass in the ribbon 17, or of the metal in the bath 14, until the ribbon surface reaches a temperature at which it is sufficiently stiffened to allow its transfer to a lehr on mechanical conveying means without detriment to the surfaces.

One type of mechanical conveying means that can be used includes supporting rollers 30 and 32 and superimposed roller 33 mounted outside of the discharge end of the tank 15. Any or all of the rollers 30 to 33 may be driven and cooperate to apply a tractive effort to the ribbon of glass moving towards the outlet end sufficient to advance it along the bath.

When a ribbon of less than equilibrium thickness is desired, this can be obtained by increasing the speed of the rolls 30 and 33 and thereby modifying their tractional effort and attenuating the molten glass body 17 of stable thickness.

However this brings up new problems in temperature control and a further requirement for accuracy and flexibility to insure proper regulation of the longitudinal change in the viscosity of the glass in relation to the tractive effort of the rolls 30 to 33 and to arrest further dimensional change once the ribbon has assumed the desired width and thickness.

Similarly, a critical quality element that has been found to be closely related to cooling in front end of the bath is the defect known as large open bottom bubbles, and the correct use of properly designed heat exchangers can minimize if not entirely eliminate troublesome problems with bubbles as well as with distortion and other temperature oriented defects.

Consequently, the improved cooling provided by practicing the method of this invention in the float chamber and particularly in selected areas thereof is of considerable practical value and commercial importance. Of equal importance is the provision of the special heat exchangers that are capable of exerting a cooling action on the glass floating over the tin bath that is susceptible to accurate control and ready and rapid adjustment.

Accordingly, one form of heat exchanger contemplated by the present invention and particularly well adapted for use in a float area, includes an elongated core member of hollow metal construction, through which a suitable coolant such as water can be circulated, and relatively short insulating sleeves fitted over and movable on the cooling member.

A specific embodiment of such a heat exchanger is indicated at 19 and 20 in FIGS. 1 and 2 of the drawings and more fully illustrated in FIGS. 3 to 6. As there shown, the cooling core member, designated 35, is elongated in shape and, while it may be made up of a single section casing and have any one of a number of different cross-sectional forms, has been shown here as being made up of a plurality of individual sections welded together. Thus, the member 35 is made up of two individual sections 36 and 37 assembled in side-by-side relation to provide parallel passageways for the coolant and a rectangular shape for the cooling member.

Insulating sleeves 38 to 41 are slide fitted over the member 35 at intervals along its length and act to reduce the cooling action exerted by the member 35 on any hotter surface or body located in sufficient proximity to establish a heat exchange therebetween. All of the sleeves 38 to 41 are "U" shaped in cross section and so are of open sleeve construction to facilitate slide mounting on and sliding movement along the member 35. However, the composition and structure of sleeves 38 and 41 are somewhat different from those of sleeves 39 and 40.

Figures 4, 5:
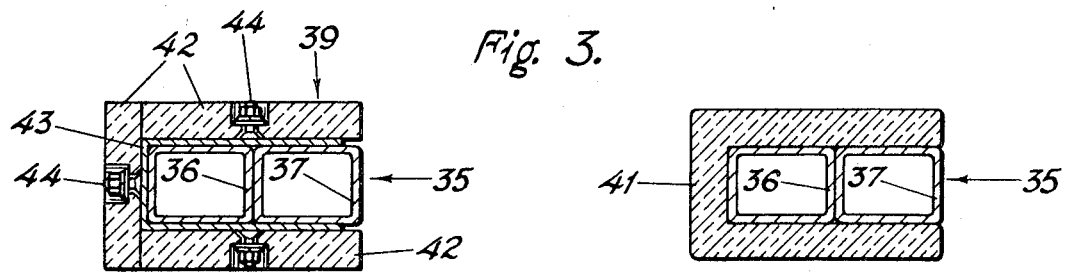
FIG. 4 is a transverse, sectional view through one of the heat exchangers, taken substantially along the line 4—4 in FIG. 3.
FIG. 5 is a view similar to FIG. 4 but taken along the line 5—5 in FIG. 3.
Figure 6:
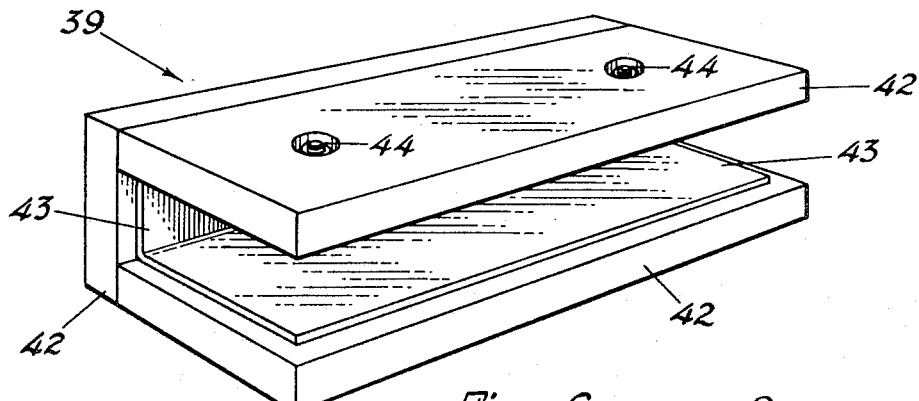
FIG. 6 is a perspective view of the heat exchanger sleeve shown in Fig. 5.

Thus, as best shown in FIG. 4, the sleeves 38 and 41, which are positioned over the exposed portions 25 of the molten bath 14 are in one piece and may be of a lightweight ceramic material, while the sleeves 39 and 40 (FIGS. 5 and 6), shown as positioned over the glass ribbon 17, are made up of three angularly assembled carbon blocks 42 mounted on a stainless steel frame 43 with recessed machine screws 44. The advantage of the steel frame is that it obviates dusting of the insulating material of the sleeve during sliding movement along the member 35 and, as shown in FIG. 6, it is preferably inset from the edges of the carbon blocks at the ends and open sides of the sleeves 39 and 40.

It is to be understood of course that other and various types of insulating materials, including fibrous and woven materials, can be employed and fitted over the member 35 in various ways to provide the slidable sleeves 38 to 41. However there is an advantage in employing carbonaceous materials over the glass ribbon, where the greatest amount of adjustment in the position of the insulating sleeves is likely to be required, because any carbon particles that may dust off will not stick to the glass.

Such heat exchangers, constructed as just described, are installed within the headspace 18 transversely across the bath spanning its entire width, at desired intervals along the length thereof, and at some nominal distance above the glass layer or ribbon 17, which may be about midway in elevation between the bottom of the electric or radiant heaters 19 and the level of the molten metal 14 as shown in FIG. 1.

When so installed, and with the sleeves 38 to 41 in approximately the desired locations along the cooling member 35, the individual sleeves can be adjusted or moved to other locations along the cooling member by means of a tool 45 (FIG. 3), manipulated from outside the plenum chamber or headspace 18, to locate them in the exact positions required to provide localized insulation of the cooling member 35 at selected points and to establish a desired cooling pattern for the glass ribbon.

Specifically with the sleeve arrangement shown in FIGS. 2 and 3, the full cooing effect of the member 35 can be had on the middle, normally hottest portion of the glass ribbon, while its cooling action on the normally cooler marginal portions of the ribbon will be reduced by the sleeves 39 and 40 and, on the exposed portions 25 of the molten metal bath 14, by the sleeves 38 and 41. Also, by varying the relative thickness of the individual sleeves a greater reduction of cooling can be had in one or more areas than in others.

It will be obvious, too, that a larger or smaller number of sleeves can be employed, that they can be of any required length, that individual sleeves can be readily shifted to any desired position to overcome or compensate for cold spots or streaks that may develop in the glass ribbon, and that sleeves designed as are sleeves 38 to 41 can be employed to reduce the cooling action of the member 35 on the roof of the float chamber, where excessive cooling may cause sulfides and other deposits to form, as well as on the glass ribbon.

To fully appreciate the value of the present invention in a float glass operation it must be realized that the continuous maintenance of a plenum in the headspace 18, as well as the maintenance of a continuous carefully controlled operation, is of prime importance. Thus, any opening of the plenum chamber, or any manipulative function that permits outside air to leak into the chamber, are serious matters that adversely affect, not only the productive capacity of the float machine, but the quality of the product it is producing.

Consequently, efforts to change the cooling pattern of an overhead float cooler in the past have seriously disrupted both quality and production because they involved completely removing an existing cooler or coolers and installing different ones with different cooing characteristics. To do this it was necessary to break the plenum chamber seal at each side of the cooler location (the coolers were sealed in or to the chamber wall with a gas-impervious mortarlike material), slide the old cooler out and the new one in and then reseal the chamber. This was both time and labor consuming and opened the plenum chamber to the practically unobstructed entrance of oxygen and other airborne contaminates.

On the other hand, with the heat exchangers of this invention, the cooling member 35 can be substantially permanently mounted and sealed into the plenum chamber and its cooling pattern can be adjusted or altered by simply sliding the sleeves 38 to 41 to any desired positions thereon with the tool 45 operated from the outside of the chamber through a flexible self-sealing member 46 covering a small opening 47 through the chamber wall. Even when it becomes necessary to remove or replace any sleeves, of the structure of sleeves 38 to 41, or to substitute similar ones of different lengths or thicknesses for them, this can be readily done by introducing or removing the sleeves through one of the conventional and adjacent quick opening and closing observation doors or windows 48 and and slipping the U-shaped sleeve structures on or off of the cooling member 35 from one side thereof.

It is believed to be apparent from the foregoing that the method and apparatus of this invention make is possible to readily establish, accurately control and materially alter the temperature pattern in or on a mass or body of material for a variety of purposes and in many environments; that the principle of the invention can be applied to and practiced with a heat exchanger in which a heating element or member is employed as a core instead of a cooling member such as the member 35; and that such core members, as well as the sleeves, shields or covers therefor, may take any one of a number of materially different shapes and forms.

In the latter connection, while the sleeves 38 to 41 have been shown as open sided so as to expose one entire side of the core member 35, they can as well be slotted to expose only a part of one side or closed to cover the entire perimeter of the core member. Conversely, they can be made more open to expose additional surfaces or surface areas. Similarly, then can be constructed and positioned on the core member to expose top and bottom as well as side areas thereof.

In fact it is to be understood that the forms of the invention herein shown and described are to be taken as illustrative embodiments only of the same, and that various changes in the size, shape and arrangement of parts, as well as various procedural changes, may be resorted to without departing from the spirit of the invention as defined in the following claims.

I claim:

1. In a method of regulating the radiant heat exchange between a ribbon of glass floating on and moving over a bath of molten metal through a plenum chamber and beneath a stationary elongated heat exchanger extending transversely across said chamber and maintained at a temperature different from the temperature of said ribbon, so as to produce a desired temperature pattern across said ribbon, the improvement comprising the steps of placing a relatively short cover over a segment of said heat exchanger within said chamber after said exchanger has been installed therein, and moving said cover longitudinally along said heat exchanger to a selected position to retard the exchange of heat between a limited segment of said heat exchanger and said ribbon.

2. In apparatus for producing glass in sheet form including a tank, a bath of molten metal in said tank, a substantially closed chamber enclosing an atmosphere other than the outside atmosphere over said bath, means for establishing a buoyant body of molten glass in ribbon form on said bath, means for advancing said ribbon along said bath and subjecting it to a controlled tractive force in the direction of its said advance, heating means positioned above said body of glass to heat the body, and a heat exchanger comprising an elongated hollow casing located within said substantially closed chamber between the roof thereof and said body of glass and extending transversely of said chamber, the improvement comprising a generally U-shaped sleeve positioned over a portion of said casing, one leg of said sleeve extending over and slidably resting upon the top of said casing and the other leg extending across the bottom of said casing between said casing and said ribbon whereby said sleeve can be moved to selected positions longitudinally along said casing to regulate heat transfer between said ribbon and said casing at said selected positions.

3. Apparatus as defined in claim 2 in which said sleeve is mounted on a U-shaped frame which directly contacts said casing and spaces said sleeve therefrom.

4. Apparatus as defined in claim 2 in which said casing is a metal casing through which a heat-absorbing fluid is circulated to provide a radiant cooler, and said sleeve is an open sleeve of insulating material mounted on a U-shaped internal frame which slidably rests on said cooler and spaces said insulating material from said metal casing.

5. Apparatus as defined in claim 2 in which said elongated hollow casing is a radiant cooler, and said sleeve is of insulating material.

6. Apparatus as defined in claim 5 in which said substantially closed chamber is provided with a readily closable opening adjacent said casing through which said sleeve can be removed from and mounted on said cooler and with a second opening, and a tool operable through said second opening for sliding said sleeve along said cooler.

7. Apparatus as defined in claim 2 in which said sleeve is made up of blocks of refractory material mounted on a frame, and said frame comprises a U-shaped metal structure and is provided with means for securing said blocks to the outer faces of said U-shaped structure.

* * * * *